(12) United States Patent
Jenssen

(10) Patent No.: US 11,186,328 B2
(45) Date of Patent: Nov. 30, 2021

(54) FIFTH WHEEL TURNTABLE LUBRICATION DEVICE

(71) Applicant: Fifth Wheel AS, Steinkjer (NO)

(72) Inventor: Tore Jenssen, Steinkjer (NO)

(73) Assignee: Fifth Wheel AS, Steinkjer (NO)

( * ) Notice: Subject to any disclaimer, the term of this patent is extended or adjusted under 35 U.S.C. 154(b) by 412 days.

(21) Appl. No.: 16/336,912

(22) PCT Filed: Oct. 2, 2017

(86) PCT No.: PCT/EP2017/074967
§ 371 (c)(1),
(2) Date: Mar. 27, 2019

(87) PCT Pub. No.: WO2018/065361
PCT Pub. Date: Apr. 12, 2018

(65) Prior Publication Data
US 2020/0031407 A1    Jan. 30, 2020

(30) Foreign Application Priority Data

Oct. 5, 2016    (NO) .................................... 20161596

(51) Int. Cl.
*B62D 53/08*    (2006.01)
*F16N 11/00*    (2006.01)
(Continued)

(52) U.S. Cl.
CPC .......... *B62D 53/0885* (2013.01); *F16N 11/00* (2013.01); *F16N 15/00* (2013.01);
(Continued)

(58) Field of Classification Search
CPC ..... B62D 53/0885; F16N 11/00; F16N 15/00; F16N 7/385; F16N 2270/30
(Continued)

(56) References Cited

U.S. PATENT DOCUMENTS 1,607,846 A * 11/1926 Potter .................... A22C 11/02
452/35
2,889,922 A * 6/1959 Clarvoe .................... C09J 5/00
206/484
(Continued)

FOREIGN PATENT DOCUMENTS

CA    2104343 A    2/1995
CN    2668985    1/2005
(Continued)

OTHER PUBLICATIONS

Search Report from China Patent Office dated Dec. 1, 2020, cited as statement relevance for non-English language refefnces cited therein, in particular table showing international relevance codes ("Y" and "A") for the CN references cited in this IDS.
(Continued)

*Primary Examiner* — Michael R Mansen
*Assistant Examiner* — Mark K Buse
(74) *Attorney, Agent, or Firm* — Christian D. Abel

(57) ABSTRACT

A turntable lubrication device for lubricating sliding mating surfaces of a base plate and an upper plate, the device comprising; —a casing, and—a lubricating grease contained and sealed within the casing, which lubrication device is intended to be manually positioned on the mating surface of the base plate and ruptured under pressure of the upper plate when the upper plate is positioned on top of the base plate, thereby allowing the grease to be distributed between the mating surfaces. The lubrication device is elongated and plastically formable, thus allowing the device to be shaped and curved so that it substantially follows a circumferential shape of the base plate such that the grease is evenly distributed over the sliding mating surfaces.

8 Claims, 4 Drawing Sheets

(51) Int. Cl.
*F16N 15/00* (2006.01)
*F16N 7/38* (2006.01)

(52) U.S. Cl.
CPC .......... *B62D 53/0842* (2013.01); *F16N 7/385* (2013.01); *F16N 2270/30* (2013.01)

(58) Field of Classification Search
USPC ........................................................ 184/5.1
See application file for complete search history.

(56) References Cited

U.S. PATENT DOCUMENTS

| | | | | |
|---|---|---|---|---|
| 3,122,788 A | * | 3/1964 | Lieberman | A22C 13/0006 264/108 |
| 4,537,308 A | * | 8/1985 | Hollander, Jr. | B65D 81/3266 206/219 |
| 4,805,767 A | * | 2/1989 | Newman | B65D 81/3266 206/219 |
| 4,913,263 A | * | 4/1990 | Spiers | B62D 53/0885 184/105.1 |
| 5,417,308 A | | 5/1995 | Hartl | |
| 5,476,673 A | * | 12/1995 | Sombrio | A22C 15/002 426/410 |
| 5,620,770 A | * | 4/1997 | Cork | B32B 15/08 428/121 |
| 5,746,438 A | * | 5/1998 | Bergmann | B62D 53/0885 280/433 |
| 6,651,848 B1 | * | 11/2003 | Redmond | B29C 51/00 222/107 |
| 2007/0131713 A1 | * | 6/2007 | Hill | B65D 47/32 222/108 |
| 2018/0281014 A1 | * | 10/2018 | Bowers | B05C 17/00516 |

FOREIGN PATENT DOCUMENTS

| | | |
|---|---|---|
| CN | 200939904 Y | 4/2009 |
| CN | 201424064 | 3/2010 |
| GB | 1559126 A | 1/1980 |

OTHER PUBLICATIONS

"Lubricant Packaging, Gel Sachet filling packaging, Lubricant oil Sachet Packaging,Pouch Packaging", YouTube, dated Mar. 27, 2013, https://www.youtube.com/watch?v=n15SI8G5Yak.

\* cited by examiner

FIFTH WHEEL TURNTABLE LUBRICATION DEVICE

The present invention is related to a lubrication device for lubrication of a sliding mating surface between a base plate and an upper plate of a fifth wheel turntable, the device comprising;
a casing, and
a lubricating grease,
wherein the lubricating grease is sealed within the casing, and
the lubrication device is to be placed on the surface of the base plate and ruptured under pressure of the upper plate disposed on top of the base plate, and wherein lubricating grease is distributed in said mating surface.

The term fifth wheel comes from a coupling used on a four-wheel horse-drawn carriages and wagons. The coupling device allowed the front axle assembly to pivot in the horizontal plane, to facilitate turning. Basically, an "additional "wheel was placed on the rear frame section of the truck, which back then only had four wheels; this wheel that was placed on the frame was the "fifth wheel", hence the name. The trailer needed to be raised so that the trailer's pin would be able to drop into the central hole of the fifth wheel.

The term fifth-wheel is referred to the base plate of a fifth-wheel coupling. The fifth-wheel coupling comprises a base plate and an upper plate and provides the link between a semi-trailer and the towing vehicle, truck, tractor unit, leading trailer or dolly. Some camper trailers use a fifth-wheel configuration, requiring the coupling to be installed in the bed of a pickup truck as a towing vehicle, and "fifth wheel" is therefore sometimes used as a synonym for such campers in North America. The coupling comprises of a kingpin, a 2-or-3½-inch-diameter (50.8 or 88.9 mm) steel pin on the front of the semi-trailer situated on the upper plate, and a horseshoe-shaped coupling device called a fifth wheel (base plate) situated on the rear of the towing vehicle.

The surface of the semi-trailer plate, in the following referred to as the upper plate, rotates against the surface of the fixed fifth wheel plate, in the following referred to as the base plate. To reduce friction, grease is applied to the surface of the fifth wheel plate and allowing the grease to be distributed between the mating surfaces when the upper plate is arranged on top of the base plate. The configuration is sometimes called a turn-table in Australia and New Zealand, especially if it is a rotating ball-race-bearing type. The advantage of this coupling is improved towing stability.

Today's fifth wheel couplings allow the trailers to slide into the fifth wheel and lock into it, and are a very reliable unit when maintained and serviced properly. The engagement of the king pin into the fifth-wheel locking mechanism is the only means of connection between the towing vehicle and the trailer; no other device or safety mechanism is used. Couplers and pintle hooks are used as safety chains in the event of a trailer separation while going down the road. Trailer-to-trailer connection can also be made by using fifth wheels.

In the following a turntable is referred to a fifth wheel coupling of a vehicle, and the term will be used interchangeably. The turntable comprises a base plate and an upper plate and arranged with mating surfaces when the upper plate is disposed on top of the base plate.

To minimize wear and friction between the base plate and the upper plate, the mating surfaces needs regular lubrication. Lack of lubrication may lead to hazardous situations. A turntable between a towing vehicle and a semi-trailer may carry a load of more than 15 tons. Such heavy loads in combination with speed creates major devastations when it collides.

Normally, the turntable should be lubricated once a week for trailers in daily use. The lubrication intervals depend on the weight of the arrangements and the mileage. Generally, the lubrication intervals for the turntable are more frequent than the lubrication intervals on other trailer equipment.

It is critically important that the facing surfaces or the mating surfaces of the base plate and the upper plate are adequately lubricated to minimize wear and friction. If the turntable or the fifth wheel coupling, is not adequate lubricated, the mating surfaces made of steel could begin to rub against each other, leading to a "welding" of the mating surfaces, and eventually to interlocking of the coupling. The vehicle has no ability to make a turn. In cold climate and especially during winter season, this will cause the front wheels of the truck to lose traction, hence causing the towing vehicle and the semi-trailer to run straight in a turn. During summertime, the locking of the turntable can cause twitching of the vehicle since the upper plate (the one with king pin) partly jumps in the position, causing pluck on the semi-trailer, which explains why some trucks are overturning in road turns with dry asphalt.

Numerous methods exist for lubricating the mating surfaces of a fifth wheel coupling or a turntable. They can be divided into automatic or manually lubrication systems.

One automatic lubrication system is a central lubrication system comprising several injection holes arranged on the base plate. The grease is applied automatic through the injection holes for lubrication of the mating surfaces. The system does not require the semi-trailer to be disconnected from the truck. The challenge of such a central lubrication system is that the injection holes can be sealed or plugged from old grease, as well as to get the grease evenly distributed across the entire lubrication surface. In addition, the viscosity of the grease at cold temperatures makes it even harder to inject through the injection holes.

Another automatic lubrication system is a method of applying by pumping the grease inn between the mating surfaces through pipe channels situated at the side of the plate. This system has the same advantages and disadvantages as the central lubrication system described above.

Manually methods of applying lubrication grease are often the most appropriate, considering the viscosity of the grease and the evenly and adequate lubrication of a turntable.

The most common lubrication method is by disconnecting the semi-trailer from the towing vehicle, and removing the old grease manually be means of a spatula, and applying new grease by the spatula. This method gives an adequate and even distribution of the grease on the base plate, but is difficult and almost impossible during cold climate because of the viscosity of the grease at lower temperatures. In addition, this method is time-consuming and can be very messy.

Another method is by use of a grease gun, to add the grease in strips across the surface of the base plate prior to connection of the truck to the trailer. This method requires the driver to carry a plurality of grease guns inside the truck. In addition, this method does not function properly in the case of cold climate because of the viscosity of the grease and the difficulty of squeezing the grease out of the grease gun. There exists also a similar method, which a lubrication cartridge can be squeezed out from a container tube. This method holds the same challenges in terms of the viscosity of the grease during cold conditions.

All the above-mentioned prior art methods have both economic and environmental challenges. Economical in that it is difficult to make use of all the grease contained inside the gun or tube. There will always be some remaining grease inside the gun so that one cannot make use of all the grease, and there are also challenges of storing a used gun or cartridge with respect to spill and space. The environmental aspect is the amount of packaging that needs to be discarded after use.

The U.S. Pat. No. 4,913,263, discloses a packet consists of a grease composition sealed in a thin walled plastic envelope. The envelope is to be placed on the base plate of the fifth wheel coupling and ruptured under pressure of the mating of the upper plate, wherein the grease contained in the envelope is distributed in the mating surfaces of the plates. This system is quick, clean and simplifies lubrication.

However, the system does not ensure even distribution of grease on the radius of the entire base plate. In addition, the envelope bag occupies a large portion of the plates to be lubricated and are not easily adapted to the size and shape of the base plate to ensure an even distribution of the grease.

Nowadays, the driver profession is strictly regulated by the driving and rest regulations. During the workday, the driver has an enormous time pressure to bring up the cargo at the right time. In relation with the replacement of trailers, there are not always time to lubricate the turntable of the vehicle. There can also be other conditions for not lubricating the turntable or making lubrication far more difficult, such conditions can be cold climate, heavy rain, nighttime, or other external factors.

Thus, there is a need for a fifth wheel turntable lubrication system that overcomes some of the problems mentioned in the prior art systems. Especially the problem related to the time aspect and time pressure of the driver. In addition, there is a need for a lubrication system that are easy, clean and quick to apply and has the capability of adequate and even lubrication of the entire mating surfaces of the turntable.

It is an object of the present invention to provide a lubricating device for quick and efficiently applying lubricating grease to fifth wheels and similar devices.

It is further an objective of the invention to provide a lubrication device that are easy to handle and clean to bring and store inside a truck for lubrication when necessary, regardless of climate.

It is also an objective of the invention to provide a lubrication device that can adapt to the various size of fifth wheel couplings.

It is another objective of the invention to provide a lubrication device that are economical in use and more environmentally friendly.

In the following, a lubricating grease is referred to a semi solid lubricant possessing a high initial viscosity, and which viscosity is reduced under shear. This includes all kind of lubricating grease such as generic, synthetic and any combination of such. Specially those lubricating grease suitable for lubricating a fifth wheel turntable. There exist many different types of lubrication grease, depending on the different purpose. Many manufacturers produce various types of lubrication grease, which have different properties. The present invention encompasses the use of any lubrication grease suitable for lubrication of a fifth wheel turntable. Various type of lubrication grease, will not be described further.

The present invention is related to a fifth wheel turntable lubrication device for lubricating sliding mating surfaces of a base plate and an upper plate. The device comprising;

a casing, and
a lubricating grease contained and sealed within the casing, which lubrication device is intended to be positioned on the mating surface of the base plate and ruptured under pressure of the mating surface of the upper plate when the upper plate is disposed on top of the base plate, thereby allowing the grease to be distributed between the mating surfaces.

The lubrication device is elongated and plastically formable, thus allowing the device to be shaped so that it substantially follows a circumferential shape of the base plate such that the lubrication grease is evenly distributed between the sliding mating surfaces.

The lubrication device of the present invention is preferably manually positioned on the mating surface of the base plate. Manually positioning means deploy by hand. Within the scope of the invention, a lubrication device can also be positioned in other ways, such as by means of a suitable machine having insertion arms or any suitable automatically storing and deploying device.

In a preferred embodiment according to the present invention, the casing is made from an elastic and flexible material with an annular and elongate shape, such as a thin stocking-like or tubular shape for storing of the lubrication grease. The lubrication device, according to the present invention, has a shape with similarities to regular food sausages. Compared to sausages, the casing may also be referred to as sausage casing, or sausage skin.

As for regular food sausages, the casing is divided into two categories of materials; natural and artificial. Artificial casings, such as collagen, cellulose, plastic, and extruded casings. Natural sausage casings are made from the submucosa, a layer of the intestine that consists mainly of naturally occurring collagen. This should not be confused with collagen casings, which are artificially processed from collagen derived from the skins of cattle. Collagen casings are mainly produced from the collagen in beef or pig hides, and the bones and tendons. It can also be derived from poultry and fish. Usually the cost to produce sausages in collagen is significantly lower than making sausages in gut because of higher production speeds and lower labor requirements.

The collagen for artificial casings is processed extensively and, as a raw material, it is similar to bread dough prior to final production. It is then extruded through a die to the desired diameter, dried and shirred into sticks. In a newer process, a form of dough is coextruded with the meat blend, and a coating is formed by treating the outside with a calcium solution to set the coating.

Cellulose, usually from cotton linters or wood pulp, is processed to make viscose, which is then extruded into clear, tough casings. They are also shirred for easier use and can be treated with dye. Cellulosic viscose solutions are combined with wood pulp to make large diameter fibrous casings.

Plastic casings are extruded like most other plastic products. They also can be flat or shirred. Generally, smoke and water do not pass through the casing, so plastic is used for non-smoked products where high yields are expected. The inner surface can be laminated or co-extruded with a polymer. Plastic casings are generally made from polymers such as Polyamide, Polypropylene or Polyethylene.

According to a preferred embodiment of the present invention, the casing of the lubrication device is made preferably made from artificial collagen. But also, other various materials are possible as described above. Although, above mentioned various materials of the casing are compared to those materials used in food sausages, the scope of the invention also includes other elastic and flexible materials, such as rubber.

According to another preferred embodiment of the present invention, the casing comprises at least one fracture zone which will burst at a predetermined pressure, thereby allowing a controllable distribution of the lubricating grease. The fracture zone defines a "weak-spot" which will burst first during a compression of the device. A plurality of fracture zones at preset areas makes it possible to control the distribution of the lubricating grease, allowing more lubricating grease at areas which need more lubricate and less grease to areas which need less.

An advantageous feature of the present invention is that the fifth wheel lubrication device is elongated and plastically formable. The term "plastically formable" defines a device which can be shaped by applying a deformation force and that device maintains its deformed shape after the force acting has been removed. This allows the device to be manually shaped (by hand) so that it can substantially follow a circumferential shape of the base plate or any appropriate shape. This plastically formable property is achieved by the combination of lubrication grease and the elastic and flexible casing. The grease has a high initial viscosity, which provides a flexible and conformable substance contained inside a flexible casing or tubing.

Preferably, the lubrication device has an elongated shape having a length which is long in relation to width, similar to a snake-like or sausage-like device. A longitudinal section of the elongate lubrication device can be shaped and/or curved such that it can easy be adapted to the different turntables and grease pits. Accordingly, a cross-sectional shape of the lubrication is formable by deformation and/or compression. Further, the length of the lubrication device can also be adjusted and adapted by compression or stretching. Hence, allowing a precise adaptation of the lubrication device to the desired application. A further advantage is that the device can be deformed such that it is becomes more stable to avoid the device moving or falling of the base plate during positioning prior to compression of the turntable plates.

Preferably, one lubrication device is sufficient to lubricate the entire turntable or fifth wheel coupling. Within the scope of the invention, two or more lubrication devices can also be used to lubricate a turntable. The lubrication device can be made in different shapes and lengths. An advantageous feature of the lubrication device according to the present invention, is that a predetermined amount of lubrication grease can be sealed inside each device. Hence, allowing a predictable and controllable consumption of the lubrication grease.

In an embodiment of the present invention, the lubrication device displays a curved circumferential cross section. Further, and within the scope of the invention, the entire circumferential cross section can be curved. It is obvious that within the term curved entire circumferential cross section also comprises annular, circle, ellipse, oval or substantially circular cross section. An annular, elongate shape of the lubrication device makes it easy adapt the device to the grooves of the grease pit. In addition, the coinciding shapes of the grooves and the lubrication device, makes the device sure and steady in place, avoiding the risk of the lubrication device to move out from position or fall out from the base plate.

According to another embodiment of the present invention, the lubrication device comprises a plurality of interconnected sub-sections arranged in succession. This means that the lubrication device can be made with a plurality of individual sealed sub-sections. Each sub-section can easily be cut out and separated from the lubrication device and used for any desired purpose. The device can even comprise a plurality of small sections displaying a chain of capsules, which ensures that the lubrication grease is evenly distributed and not escapes at one end or develop a crack zone when the climate is hot. According to the invention, each section may be sealed by a knot, a twisting or by welding together a cross-section of the casing.

The size of the lubrication device may vary according to the application. Preferably, they are premade to fit into the grease pit of different base plates. In an embodiment of the present invention, the diameter of the lubrication device can be in the interval from 4-35 mm, more preferably the diameter is from 8-20 mm. Also, bigger and smaller diameters are appropriate depending on the purpose and objective. The length of a lubrication device, or a sub-section can be in the interval from 0.1-3.5 meters. Within the scope of the invention, any desired length is possible. In the case of chain capsules, the sub-sections can have even smaller lengths arranged in succession.

In an embodiment of the present invention, the lubrication device can be made small enough to fit into the gap between the base plate and the upper plate, while the kingpin is still in a locked position and the both plates are still attached to each other. This simplifies the lubrication process and makes the lubrication process much faster. To provide a sufficient gap between the mating surfaces, following procedures may be appropriate:

The support legs of the trailers are lowered to ground level. The towing vehicle is then lowered such that there will be clearance (a gap) between the mating surfaces of the base plate and the upper plate. This procedure ensures a gap across the whole mating surface of the turntable, allowing the lubrication device to be inserted by means of a small pinch or a stick, such as a paint stick or similar.

One of the driving wheels of the truck is driven on an elevation such that the truck will have a longitudinal twist. This causes the half part of the mating surfaces to be exposed such that the lubrication device can be inserted into the gap. Accordingly, the lubrication device can be inserted by means of a small pinch, stick or other aids, in order to protect the fingers of the driver.

The basic principle of the present invention is to provide a lubrication device comprising a lubrication grease that are moldable/flexible and sealed inside an elongate elastic casing sleeve. The lubrication device has a shape like a "lubrication sausage" with an annular and elongate shape. The "sausage" is formable and can be loaded on the baseplate of a fifth wheel turntable, prior to connecting the trailer. This operation is so simple that in periods of time pressure, cold climate, and or where for other reasons decide not to lubricate the turntable, could still choose to lubricate, since the operation is quick and easy, and not at least for the safety issue. Many descents with trailers on slippery road during wintertime are caused by the turntable being run dry and the locking of the turntable.

The present invention is also related to a method of manufacture a lubrication device according to the present invention. The method comprising the steps of:
  a) providing a tube-like elongate casing made from an elastic and flexible material, the casing comprises a sealed end and an open end,
  b) threading the open end and the subsequent casing body onto a grease supply nozzle until the nozzle is adjacent to the sealed end, c) adding lubrication grease from the nozzle and into the casing by pressing the lubricating grease into the casing, d) sealing at least one section of the lubricating grease by sealing a cross sectional section of the casing.

According to a preferred embodiment of the present invention, the casing of the lubrication device is made preferably made from artificial collagen. But also, other various materials are possible as described above. According to the invention, each section may be sealed by a knot, a twisting or by welding together a cross-section of the casing.

The description above, as well as further objects, features and advantages of the present invention will be more fully appreciated by reference to the following detailed description of the preferred embodiment which should be read in conjunction with the accompanying drawings in which.

Figure 5A:
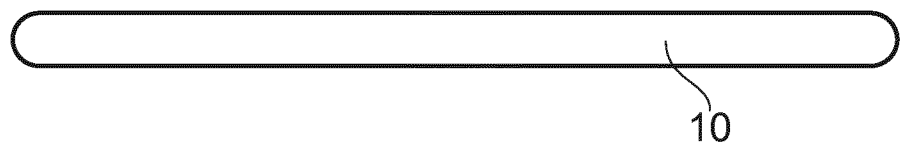

FIGS. 5a), b) and c) Shows the plastically formable property of the lubrication device.

Figure 1:
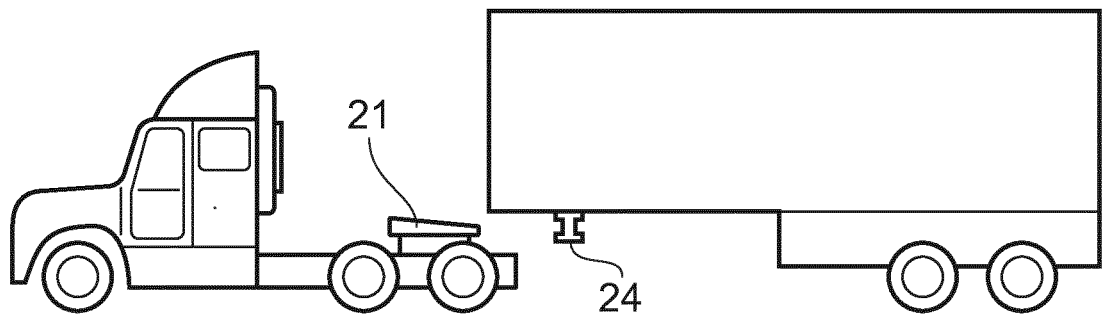
FIG. 1 Shows a towing vehicle and a trailer with a fifth-wheel coupling.

FIG. 1 shows a towing vehicle and a semi-trailer. The towing vehicle is arranged with a fifth wheel for receiving a kingpin 24 mounted on a trailer. The fifth-wheel coupling 20 comprises a base plate 21 and an upper plate 22 and provides a link between the semi-trailer and the towing truck. The base plate 21 is situated on the towing vehicle while the upper plate 22 with a kingpin 24 is situated on an underside of the semi-trailer.

Figure 2:
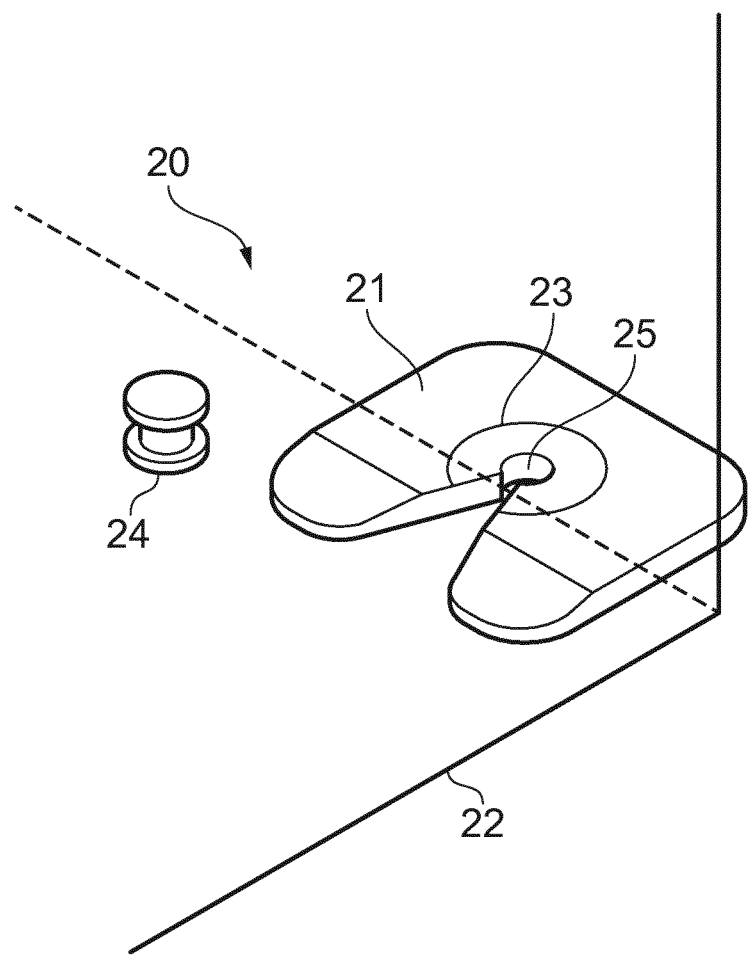
FIG. 2 Shows a turntable of a fifth wheel according to the present invention.

FIG. 2 shows a turntable of a fifth wheel coupling 20. The fifth-wheel coupling 20 provides the link between a semi-trailer and the towing vehicle, truck, tractor unit, leading trailer or dolly. The coupling consists of a kingpin 24, a steel pin 24 mounted on an upper plate (not shown) on the front of the semi-trailer, and a horseshoe-shaped coupling device called a fifth wheel 21 (base plate) on the rear of the towing vehicle. The fifth wheel turntable comprises a base plate 21 (also called a fifth wheel) with a grease pit 23 arranged as an elongate groove on the surface of the base plate 21. The elongate groove 23 or grease pit 23 can have different shape and size according to the different turntables on different vehicles.

The base plate 21 comprises a recess 25 for introduction of a corresponding kingpin 24 located on the upper plate 22 of a trailer.

According to the invention, a lubrication device 10 (shown in FIG. 3), which has a "sausage-like" shape, is placed on the base plate 21 and formable to adapt to the shape of the grease pit 23 so that it lays stable and will not move or fall out from the plate during operation. The lubrication device 10 are ruptured under pressure when the upper plate 22 is being arranged on top of the base plate 21, and wherein the lubrication grease 12 stored inside the lubrication device 10 will be distributed in the mating surface between the base plate 21 and the upper plate 22.

Figure 3:
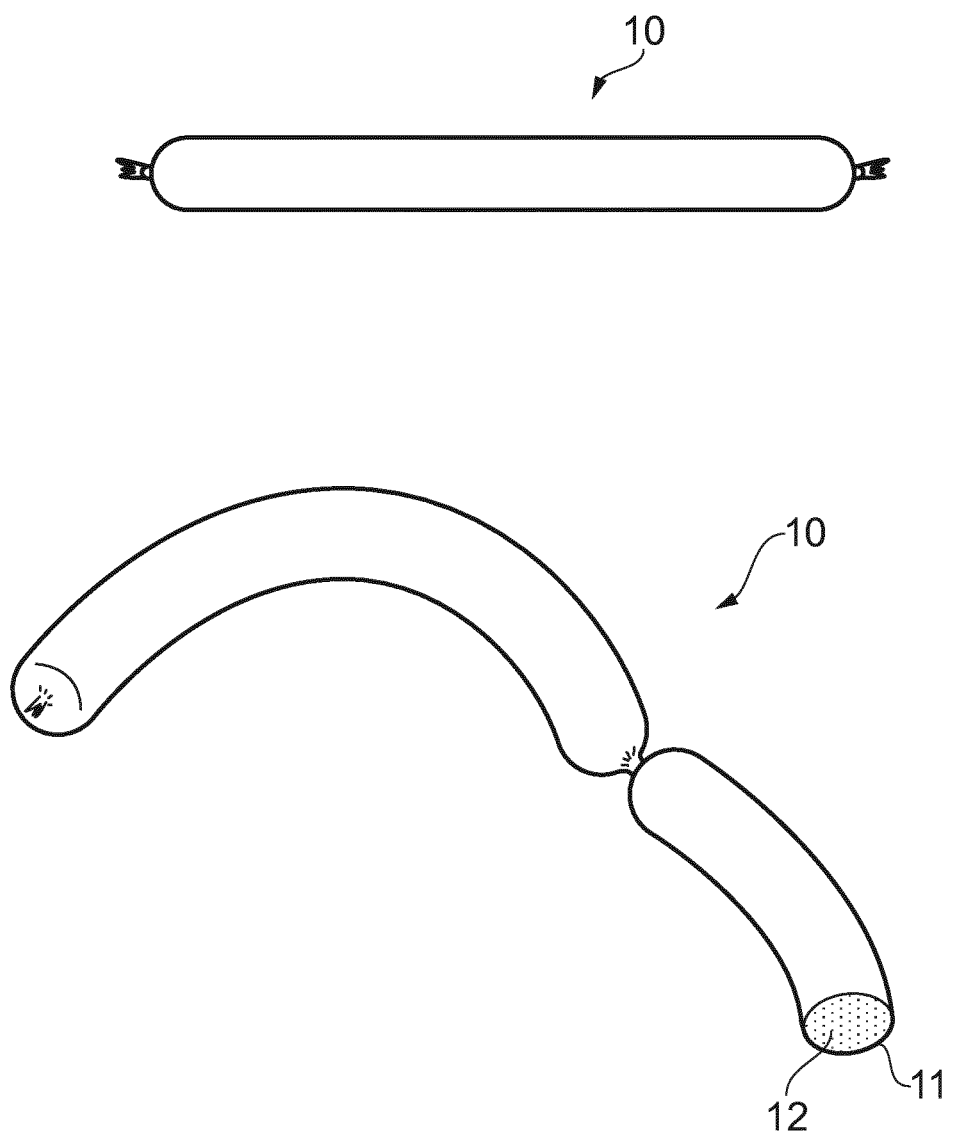
FIG. 3 Shows a lubrication device according to the present invention comprising a casing and lubrication grease contained within the casing.

FIG. 3 shows a lubrication device 10 according to the present invention, where the device 10 comprises a lubrication grease 12 stored and sealed inside an elastic and flexible casing 11. The lubrication device 10 comprises at least one section of sealed lubrication grease 12, each section having an elongate shape with a generally circular cross section. As shown, the device may comprise a plurality of interconnected sections 12 arranged in succession.

The casing 11 may have a sleeve-like shape and be made from natural or artificial material, with similarities to regular food sausages. The casing 11 defines the material that encloses the filling of the sausage. Casings are made from different materials which can be divided into two categories of materials, natural and artificial. Artificial casings, such as collagen, cellulose, plastic, and extruded casings. Natural sausage casings are made from the sub-mucosa, a layer of the intestine that consists mainly of naturally occurring collagen. This should not be confused with collagen casings, which are artificially processed from collagen derived from the skins of cattle.

The lubrication grease 12 has a high viscosity which provides a flexible and comfortable liquid, easy to form to any shape, in any desired length and easy to divide into sections. The lubrication device 10 may comprise of a plurality of individual sealed sub-section arranged in succession, easy to separate by a scissor or knife.

Figure 4:
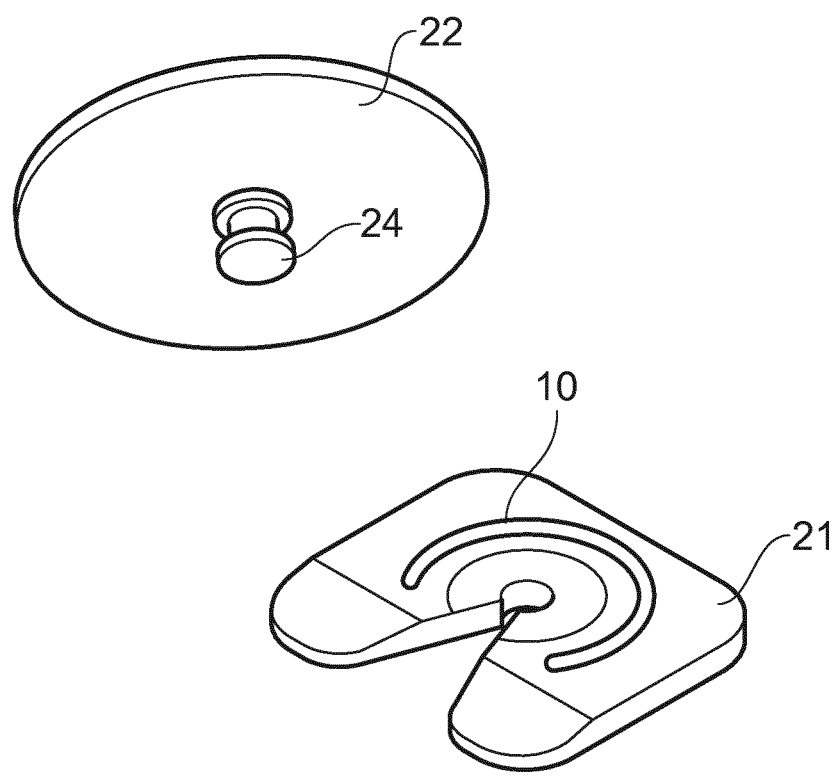
FIG. 4 Shows a fifth wheel turntable comprising a base plate and an upper plate, wherein the lubrication device is positioned on the mating surface of the base plate.

FIG. 4 shows a lubrication device 10 according to the present invention, positioned on the mating surface of a base plate 21. The device 10 is shaped such that it substantially follows a circumferential shape of the base plate 21. This advantageous embodiment ensures that one single lubrication device 10 covers a large area of the base plate 21, such that when the upper plate 22 is disposed on top of the base plate 21, the casing 11 of the lubrication device 10 will rupture due to the pressure of the upper plate 22, and wherein the lubrication grease 12 is distributed between the sliding mating surfaces of the base plate 21 and the upper plate 22. If more lubrication grease 12 are needed, two or more lubrication devices 10 can be used.

FIG. 5a)-c) shows the plastically formable property of the lubrication device 10. FIG. 5a) shows the device 10 as it may appear after production. The device 10 displays a longitudinal (snake-like) shape and has a substantially annular cross-sectional shape. According to the invention, the device 10 can also be manufactured in other appropriate cross-sectional shapes. As illustrated below, it can also de deformed into other appropriate shapes.

Figure 5B:
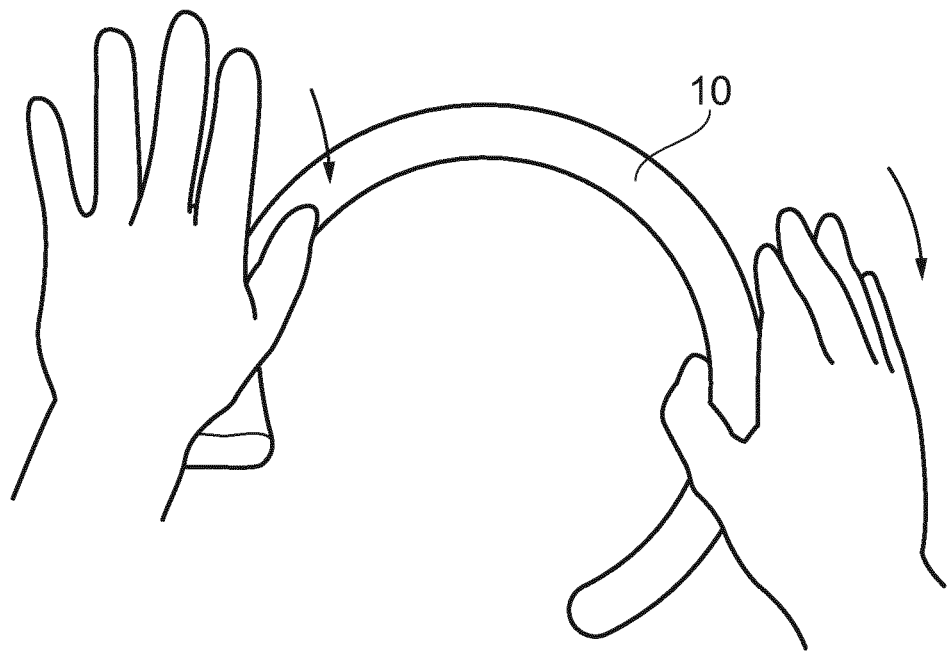

FIG. 5b) shows that the device 10 are formable by applying a force. According to the invention the lubrication device 10 can be compressed, stretched and bended such that it obtains a different shape. Advantageously, the device 10 obtains and maintains its deformed shape even after the force applied has been removed. The FIG. 5b) shows the deformation force in form of a left hand compressing a section of the device 10 and a right hand bending the device 10, resulting in a deformed shape of the lubrication device 10.

Figure 5C:
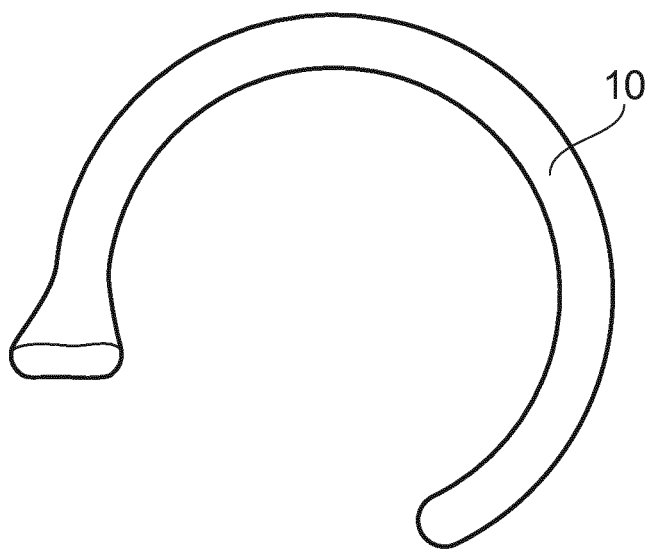

FIG. 5c) illustrates that when the hand force acting on the lubrication device 10 has been removed, the device 10 obtains and maintains its deformed shape.

Although preferred embodiments of the invention have been illustrated in the accompanying drawings and in the foregoing detailed description, it will be understood that the invention is not limited to the embodiments disclosed, but is capable of numerous arrangements, modifications, and substitutions of parts and elements.

The invention claimed is:

1. A fifth wheel turntable lubrication device for lubricating sliding mating surfaces of a base plate and an upper plate, the lubrication device comprising:

a casing, and a lubricating grease contained and sealed within the casing, which said lubrication device is intended to be positioned on the sliding mating surface of the base plate and ruptured under pressure of the sliding mating surface of the upper plate, when the upper plate is disposed on top of the base plate, thereby allowing the lubricating grease to be distributed between the sliding mating surfaces, wherein the lubrication device is elongated and plastically formable, thus allowing the lubrication device to be shaped so that it substantially follows a circumferential shape of the base plate such that the lubricating grease is evenly distributed between the sliding mating surfaces.

2. The turntable lubrication device according to claim 1, wherein the casing is made from elastic and flexible material.

3. The turntable lubrication device according to claim 1 or 2, wherein the casing is made from natural, artificial or a combination of natural and artificial materials.

4. The turntable lubrication device according to claim 3, wherein the casing is made from non-intestinal collagen.

5. The turntable lubrication device according to claim 1, wherein the lubricating grease is a semi solid lubricant grease possessing a high initial viscosity.

6. The turntable lubrication device according to claim 1, wherein a casing shape of the lubrication device is formable by compression.

7. The turntable lubrication device according to claim 1, wherein the lubrication device is formable so as being able to adapt to a shape and fit within a grease pit situated on the base plate.

8. The turntable lubrication device according to claim 1, wherein the lubrication device comprises a plurality of interconnected sections arranged in succession.

* * * * *